Patented Sept. 1, 1942

2,294,764

UNITED STATES PATENT OFFICE 2,294,764

LIQUID PURIFICATION

Oliver M. Urbain and William R. Stemen, Columbus, Ohio, assignors to Charles H. Lewis, Harpster, Ohio No Drawing. Application July 10, 1939, Serial No. 283,673

5 Claims. (Cl. 210—24)

This invention relates to water softening and liquid purification. More specifically, it relates to materials and processes for the removal of cations from liquids by a process of cation or base exchange.

Our co-pending application, Serial No. 283,672, filed of even date herewith discloses and claims the exchange material employed in the process of the present invention and the process of producing same.

Processes of water softening and cation removal have been known for a number of years. Perhaps the most commonly used materials are the zeolites, or alumino-silicates, although many other compounds having base exchange properties have been prepared. Such compounds, however, have certain inherent disadvantages. The natural zeolites, while quite stable when brought into contact with aggressive waters, in general have a low capacity which necessitates frequent regeneration. On the other hand, the numerous synthetic zeolites which have been prepared have a much greater capacity for cation exchange but are far less durable and disintegrate rather rapidly when employed with aggressive waters.

We have found that, through the use of the materials and processes hereinafter described, the disadvantages inherent with both natural and synthetic zeolites of the prior art are overcome, and that cation exchange may be effected in highly aggressive waters while, at the same time, frequent regeneration of the exchange materials may be avoided.

It is an object of this invention to provide materials and processes for efficient cation exchange. It is a further object of this invention to provide materials, and processes for the preparation of such materials, which possess high capacity for cation exchange and which are highly stable when used even in aggressive waters. A still further object of this invention is to provide a simple and economic process by which stable high capacity cation exchange materials may be prepared. Another object of this invention is the provision of efficient methods of effecting cation exchange with such materials, and effecting regeneration of such materials when exhausted.

Other objects will be apparent to those skilled in the art from the following description of the processes and materials employed.

The materials which we have found are particularly stable and possess high exchange capacity are those prepared in the following manner.

Hard or semi-hard coals, such, for example, as Pocahontas or Pittsburgh #8, and bituminous coals, such, for example, as Hocking coal, serve as a basis for our novel materials. Generally speaking, the hard and semi-hard coals yield cation exchange materials higher in capacity than those prepared from the bituminous coals.

The initial step in the preparation of our cation exchange materials comprises mixing the selected coal, in dry granular form, with anhydrous ferric chloride and heating such a mixture to a temperature of approximately 300° C., with constant stirring, until reactions between the components of the mixture is complete.

It is of primary importance that the components of the mixture be entirely free from moisture, and for this reason the coal must be dry and the ferric chloride must be anhydrous.

In its anhydrous form, ferric chloride melts at 282° C. and sublimes at 315° C. The reaction between coal and ferric chloride is effected when the ferric chloride is in molten form, and therefore, reaction between the components of the mixture must be effected at temperatures within this range, i. e., between 282° C. and 315° C.

Although the proportions of coal and ferric chloride contained within the mixture is not critical, we have found that the best cation exchange materials are those prepared when approximately 100 parts by weight of coal is reacted with 80 parts by weight of ferric chloride. A smaller proportion of ferric chloride results in the production of a material having lower capacity for cation exchange.

In general, the coal is ground and graded to a size lying within the range of 8 to 20 mesh. It is then mixed with the anhydrous ferric chloride and heated to the proper temperature, approximately 300° C. with constant stirring and agitation.

Reaction between the components of the mixture is generally quite rapid and is usually completed in less than 30 minutes. Completion of the reaction is indicated by the fact that the reaction mixture becomes thoroughly dry due to the disappearance of the molten ferric chloride.

After reaction between the components of the mixture is completed, the mass is cooled and water washed until the water washings are substantially colorless. The reaction mass is then treated with an alkaline solution of relatively low concentration for a period of from approximately 10 to 30 minutes. Alkalies, such for example as sodium and potassium hydroxide may be used for this purpose, and the concentration of the alkali solution may vary from 2 to 10%.

After treatment of the reaction mass with alkali solutions, the mass is water washed to free it of alkali, and is then dried.

By such a process, there is prepared a base exchange material of high capacity and of unusual stability. When sodium hydroxide is used as the treating agent, the base exchange material contains sodium cations, while, when potassium hydroxide is the alkali employed, the resultant cation exchange material contains exchangeable potassium ions.

The chemical explanation of the reaction involved in the preparation of our novel materials is believed to be as follows.

It is believed that when coal is treated with molten anhydrous ferric chloride, the ferric iron is partially reduced to the ferrous state. The chlorine liberated by this oxidation-reduction reaction is then believed to react with the hydrogen of volatile hydrocarbons of the coal opening up the ring structures thereof. Since gaseous hydrogen chloride is given off in copious quantities, it is believed that the ferrous iron goes into the exchange position in the coal, and that subsequent treatment of the mixture with an alkali metal hydroxide results in replacement of the ferrous cation by the alkali metal cation, thus producing a cation exchange material replete with exchangeable alkali metal cations.

Stated otherwise, it is believed that the ferric chloride oxidizes certain portions of the constituents of the coal to active groupings for base or cation exchange. As fast as the active groupings are formed it is thought they are stabilized in the active state by the ferric or ferrous iron present, thus preventing further oxidation to an inactive state. The ferric chloride probably acts as a condensing agent to stabilize the coal constituents. The vigorous oxidation-reduction reaction is believed to open up the ring structures to yield groupings active in base or cation exchange.

Although we believe the foregoing to be a satisfactory explanation of the chemistry involved in the formation of our active cation exchange materials, it is to be understood that this explanation is not to be considered as limiting the invention in any way whatsoever.

Illustrative of materials prepared in accordance with the teachings of this invention, the following examples are given:

Example I

A quantity of Pocahontas coal was ground and graded by means of sieves to obtain a fraction between 8 and 20 mesh. One hundred parts by weight of this fraction was thoroughly mixed with 80 parts by weight of anhydrous ferric chloride and the mixture heated to a temperature of 300° C. with constant stirring for a period of approximately 30 minutes. The mixture was then allowed to cool and washed free of soluble reaction products. The residual mixture was then treated for approximately 20 minutes with a 5% solution of sodium hydroxide, after which the sodium hydroxide solution was permitted to drain from the mass and the mass thoroughly washed free of alkali. After thoroughly drying, the residual mixture was screened through a 20 mesh screen and the dry product retained on the screen utilized for cation exchange. There was obtained a 50.0% yield of dry products based on the total weight of coal and anhydrous ferric chloride employed.

The efficiency of the cation exchange material prepared in this manner was tested by passing 10 gallons of hard well water having a total hardness of 20.31 grains per gallon through 40 grams of the prepared exchange material contained in a small filter unit. The hard well water was passed through the cation exchange materials in approximately one hour. The effluent from the filtrate was carefully tested for total hardness and there was found a residual hardness of 10.96 grains per gallons, thus indicating a removal of 8.24 grains per gallon.

In order to ascertain the capacity of the cation exchange material in conventional units, the total hardness removed was calculated to grains per pound of exchange material. The weight of the new exchange material was found to be 34.1 pounds per cubic foot, and by calculation, the capacity of the new exchange material was found to be 31,956 grains per cubic foot.

An exchange material having a cation exchange capacity of approximately 32,000 grains per cubic foot is believed quite novel in view of the fact that the best exchange material now available is believed to have a capacity of only approximately 12,000 grains per cubic foot.

Example II

By the same procedure outlined in Example I, a cation exchange material was prepared from a grade of bituminous coal known as Hocking coal.

There was obtained a yield of approximately 50.6% based on the quantity of coal and anhydrous ferric chloride employed.

The capacity of this cation exchange material was tested in the same manner as that prepared in Example I, and this material was found to remove 4.79 grains per gallon of total hardness from a solution containing 20.31 grains per gallon. When calculated to the conventional basis for measuring capacity, this material was found to have a capacity of 18.625 grains per cubic foot.

It will thus be seen that materials prepared from bituminous coals by the method herein described possess a higher capacity for cation exchange than the materials presently available, as far as now known, but such materials are not as effective as are materials prepared in a similar manner from hard coals such as that used in Example I.

Example III

An effort was made to prepare an effective cation exchange material from lignite by the method herein described. There was obtained, however, a yield of only 10.0% computed from the quantity of lignite and anhydrous ferric chloride employed.

The capacity of the exchange material prepared from lignite was tested in a manner similar to that prepared in Examples I and II. From a solution containing 20.31 grains per gallon of total hardness, only 0.94 grains per gallon was removed. Computed on the basis of grains per cubic foot, the capacity of this exchange material prepared from lignite was found to be only 3,635 grains per cubic foot.

The base exchange materials thus prepared are employed in water softening or liquid purification in conventional methods. They may be utilized in contact filters and adapted to use in the filter bed type of water softening equipment, or they may be added directly to the liquid with agitation, after which the converted exchange compounds may be separated and removed from the treated water or purified liquids.

Reaction of the cation exchange materials prepared in accordance with this invention with hardness forming cations are given in the following equation. For purposes of illustration, the exchange materials are represented by the formula $ZNa_2$, but this is representative only and it is to be understood that such materials may contain other exchangeable cations and any number of exchangeable cations.

After the exchange material has become exhausted, it may be regenerated by treatment with a solution of an alkali or an alkali metal salt. A preferred process of regeneration comprises treating the exhausted exchange material with a solution containing from 2 to 10% of an alkali or of an alkali metal salt, such for example as sodium hydroxide or sodium chloride. The regenerating solution should then be washed from the exchange material preferably by a solution free of calcium and magnesium ions. It has been found convenient to utilize, as the wash solution after regeneration, a quantity of water which has passed through the filter when the filter was first placed in operation. After the regenerated exchange material is again in use, a quantity of the first water passing therethrough should be reserved for washing after the next regeneration.

Representative equations for the regeneration of exchange materials which have been used to remove calcium and magnesium from hard water, are given:

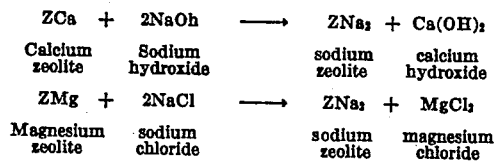

The cations removed from the water treated will, of course, be found in the regenerated solution, and, if recovery is desired, they can be removed by conventional methods, such as fractional distillation or fractional crystallization.

Materials prepared in accordance with this invention are, in general, completely regenerative. Illustrative of the capacity of a regenerated material, there is given the following example.

Example IV

The exchange material prepared and used in Example I above, after it had been completely exhausted, was regenerated by treatment with a 5% solution of sodium hydroxide. It was then washed free of alkali with a portion of the effluent obtained from that filter when first prepared. The capacity of this exchange material, after regeneration, was determined in the same manner as its original capacity was determined, and was found to be 32,560 grains per cubic foot. This represents an increase in exchange capacity following regeneration which, it is believed, is due to the purification of the exchange material by the solution employed in the regeneration step.

It is to be expressly understood that the foregoing description and examples are merely illustrative and are not to be considered as limiting the invention beyond the scope of the subjoined claims.

We claim:

1. A process of base exchange comprising contacting hard water with a carbonaceous alkali metal zeolite prepared by effecting an oxidation-reduction reaction between dry granular coal and anhydrous ferric chloride in the molten state, and thereafter treating the resulting product with a solution containing alkali metal cations.

2. A process of base exchange comprising contacting hard water with a carbonaceous alkali metal zeolite prepared from the oxidation-reduction reaction between dry granular hard coal and anhydrous ferric chloride at a temperature between 282° C. and 315° C., and treating the resulting product with a solution containing alkali metal cations.

3. A process of exchanging cations in hard water comprising contacting the said water with a product prepared by effecting an oxidation-reduction reaction between dry hard coal graded from 8 to 20 mesh and anhydrous ferric chloride, said reaction taking place at a temperature between 282° C. and 315° C., and thereafter treating the resulting reaction product with a solution containing alkali metal cations.

4. A process of base exchange comprising contacting hard water with a base exchange material prepared by mixing approximately 100 parts by weight of coal graded to from 8 to 20 mesh, with approximately 80 parts by weight of sublimed ferric chloride, heating the mixture to a temperature between 282° C. and 315° C. in the absence of water to effect an oxidation-reduction reaction, with constant stirring until the molten ferric chloride disappears from the reaction mixture, cooling and water washing the resulting product, treating the resulting product with a 2 to 10% solution of an alkali metal hydroxide, and thereafter washing and drying the carbonaceous alkali metal zeolite thus obtained.

5. A process of exchanging cations in liquids comprising the steps of bringing the liquid into contact with an alkali-treated product of an oxidation-reduction reaction between dry granular hard coal and anhydrous ferric chloride at a temperature between 282° C. and 315° C., regenerating the exchange material when exhausted with a 2 to 10% solution of an alkali metal hydroxide free of cations which it is desired to remove from the liquid, and further contacting said material with additional liquids.

OLIVER M. URBAIN.
WILLIAM R. STEMEN.